(12) United States Patent
Howard et al.

(10) Patent No.: US 7,962,467 B2
(45) Date of Patent: Jun. 14, 2011

(54) SYSTEMS AND METHODS FOR RECOGNITION OF INDIVIDUALS USING MULTIPLE BIOMETRIC SEARCHES

(75) Inventors: James V. Howard, Saugus, MA (US); Francis Frazier, Belmont, MA (US)

(73) Assignee: L-1 Secure Credentialing, Inc., Billerica, MA (US)

( * ) Notice: Subject to any disclaimer, the term of this patent is extended or adjusted under 35 U.S.C. 154(b) by 779 days.

(21) Appl. No.: 11/866,315

(22) Filed: Oct. 2, 2007

(65) Prior Publication Data
US 2009/0174526 A1    Jul. 9, 2009

Related U.S. Application Data

(63) Continuation of application No. 10/686,005, filed on Oct. 14, 2003, now Pat. No. 7,277,891.

(60) Provisional application No. 60/418,129, filed on Oct. 11, 2002, provisional application No. 60/429,501, filed on Nov. 26, 2002.

(51) Int. Cl.
*G06F 17/30* (2006.01)

(52) U.S. Cl. .................................................. 707/706
(58) Field of Classification Search .............. 707/2, 3, 707/104.1, 706
See application file for complete search history.

(56) References Cited

U.S. PATENT DOCUMENTS 6,072,894 A * 6/2000 Payne .......................... 382/118
6,963,659 B2 * 11/2005 Tumey et al. ................. 382/116

* cited by examiner

*Primary Examiner* — Etienne P LeRoux
(74) *Attorney, Agent, or Firm* — Mintz Levin Cohn Ferris Glovsky and Popeo, P.C.

(57) ABSTRACT

The search results of a first iteration of a biometric search are used to form a probe for subsequent iterations searches in a biometric database. his enables the search methodology to "drill down" into the database to find matching biometric templates. In addition, the results of a search using a template of first biometric type are used to limit the search applied using a template of a second biometric type to improve the effectiveness of a one to many search for matching data in a biometric database. These search methods are used in various combinations with different types of biometric templates and demographic information of an individual who is subject of the one to many search.

8 Claims, 11 Drawing Sheets

(A)

(B)

120

122

130

Jimmy O'Keefe
118 Ferry Street
Malden, MA

DOB 3/17/52

132

Ned Kelley
1236 Dorchester Avenue
Dorchester, MA

DOB 3/17/57

134

136

(A)            (B)

SYSTEMS AND METHODS FOR RECOGNITION OF INDIVIDUALS USING MULTIPLE BIOMETRIC SEARCHES

PRIORITY CLAIM

This application is a Continuation of U.S. application Ser. No. 10/686,005, filed Oct. 14, 2003 (now U.S. Pat. No. 7,277, 891) which claims priority to the following U.S. Provisional patent applications:

Systems and Methods for Recognition of Individuals Using Combination of Biometric Techniques (Application No. 60/418,129, filed Oct. 11, 2002); and Systems and Methods for Managing and Detecting Fraud in Image Databases Used With Identification Documents (Application No. 60/429,501, filed Nov. 26, 2002).

RELATED APPLICATION DATA

This application also is related to the following U.S. provisional and non-provisional patent applications:

Integrating and Enhancing Searching of Media Content and Biometric Databases (Application No. 60/451,840, filed Mar. 3, 2003); and Systems and Methods for Detecting Skin, Eye Region, and Pupils (Application No. 60/480,257, filed Jun. 20, 2003).

Identification Card Printed With Jet Inks and Systems and Methods of Making Same (application Ser. No. 10/289, 962, Inventors Robert Jones, Dennis Mailloux, and Daoshen Bi, filed Nov. 6, 2002, Publication No. 2003-0211296);

Laser Engraving Methods and Compositions, and Articles Having Laser Engraving Thereon (application Ser. No. 10/326,886, filed Dec. 20, 2002, Publication No. 2003-0234286—Inventors Brian Labrec and Robert Jones);

Multiple Image Security Features for Identification Documents and Methods of Making Same (application Ser. No. 10/325,434, filed Dec. 18, 2002 (now Pat. No. 6,817,530)—Inventors Brian Labrec, Joseph Anderson, Robert Jones, and Danielle Batey);

Covert Variable Information on Identification Documents and Methods of Making Same (application Ser. No. 10/3301032, filed Dec. 24, 2002 (now Pat. No. 7,063, 264)—Inventors: Robert Jones and Daoshen Bi);

Image Processing Techniques for Printing Identification Cards and Documents (application Ser. No. 10/411,354, filed Apr. 9, 2003, Publication No. 2004-0074973—Inventors Chuck Duggan and Nelson Schneck);

Enhanced Shadow Reduction System and Related Technologies for Digital Image Capture (Application No. 60/447,502, filed Feb. 13, 2003—Inventors Scott D. Haigh, Tuan A. Hoang, Charles R. Duggan, David Bohaker, and Leo M. Kenen); and Enhanced Shadow Reduction System and Related Technologies for Digital Image Capture (application Ser. No. 10/663,439, filed Sep. 15, 2003, Publication No. 2004-0140459-Inventors Scott D. Haigh, Tuan A. Hoang, Charles R. Duggan, David Bohaker, and Leo M. Kenen);

Each of the above U.S. Patent documents is herein incorporated by reference in its entirety. Aspects of the disclosure are related to U.S. patent application Ser. Nos. 09/747,735, filed Dec. 22, 2000 (now Pat. No. 6,923,378), 09/602,313, filed Jun. 23, 2000 (now Pat. No. 6,752,432), and 10/094,593, filed Mar. 6, 2002, Publication No. 2002-0170966, U.S. Provisional Patent Application No. 60/358,321, filed Feb. 19, 2002, as well as U.S. Pat. No. 6,066,594. Each of the above U.S. Patent documents is herein incorporated by reference.

TECHNICAL FIELD

Embodiments of the invention generally relate to devices, systems, and methods for data processes. More particularly, embodiments of the invention relates to systems and methods for improving the searching accuracy, use, and management of databases containing biometric information relating to individuals.

BACKGROUND AND SUMMARY OF THE INVENTION

Identity theft and other related fraudulent identification activity has the potential to become a major problem to the economy, safety and stability of the United States. Identity theft refers to one individual fraudulently assuming the identity of another and may include activities such as opening credit cards in the name of another, obtaining loans, obtaining identification documents (e.g., drivers licenses, passports), obtaining entitlement/benefits cards (e.g., Social Security Cards, welfare cards, etc.), and the like. Often, these activities are performed without the consent or knowledge of the victim. Other fraudulent identification activity can also be problematic. An individual may, for example, use either his or her "real" identity to obtain a document, such as an identification card, but may further obtain additional identification cards using one or more identification credentials that belong to another and/or one or more fictitious identification credentials.

For example, to obtain an identification document such as a drivers license, a given individual may attempt to obtain multiple drivers licenses under different identities, may attempt to obtain a drivers license using false (e.g., "made up"), identification information, or may attempt to assume the identity of another to obtain a drivers license in that individual's name. In addition, individuals may alter legitimate identification documents to contain fraudulent information and may create wholly false identification documents that purport to be genuine documents.

It is extremely time consuming and expensive to apprehend and prosecute those responsible for identity theft and identity fraud. Thus, to help reduce identity theft and identity fraud, it may be advisable for issuers of identity-bearing documents to take affirmative preventative steps at the time of issuance of the identity documents. Because of the large number of documents that are issued every day and the large history of already issued documents, however, it is difficult for individual employees of the issuers to conduct effective searches at the time such documents are issued (or re-issued). In addition, the complexity and amount of the information stored often precludes manual searching, at least as a starting point.

For example, many government and business organizations, such as motor vehicle registries, store large databases of information about individuals. A motor vehicle registry database record may include information such as an operator's name, address, birth date, height, weight, and the like. Some motor vehicle registry databases also include images of the operator, such as a facial image and/or a fingerprint image. Unless the database is fairly small, it is nearly impossible for it to be searched manually.

In some databases, part or all of the database record is digitally encoded, which helps to make it possible to perform automated searches on the database. The databases themselves, however, can still be so large that automated searching is time consuming and error prone. For example, some states do not delete "old" images taken of a given individual. Each database record might be associated with a plurality of images. Thus, a database that contains records for 10 million individuals, could, in fact, contain 50-100 million images. If a given motor vehicle registry uses both facial and fingerprint images, the total number of images may be doubled still.

One promising search technique that can be used to perform automated searching of information and which may help to reduce identity theft and identity fraud is the use of biometric authentication and/or identification systems. Biometrics is a science that refers to technologies that can be used to measure and analyze physiological characteristics, such as eye retinas and irises, facial patterns, hand geometry, and fingerprints. Some biometrics technologies involve measurement and analysis of behavioral characteristics, such as voice patterns, signatures, and typing patterns. Because biometrics, especially physiological-based technologies, measures qualities that an individual usually cannot change, it can be especially effective for authentication and identification purposes.

Commercial manufacturers, such as Identix Corp of Minnetonka, Minn. manufacture biometric recognition systems that can be adapted to be capable of comparing two images. For example, the IDENTIX FACE IT product may be used to compare two facial images to determine whether the two images belong to the same person. Other commercial products are available that can compare two fingerprint images and determine whether the two images belong to the same person. For example, U.S. Pat. Nos. 6,072,894, 6,111,517, 6,185,316, 5,224,173, 5,450,504, and 5,991,429 further describe various types of biometrics systems, including facial recognition systems and fingerprint recognition systems, and these patents are hereby incorporated by reference in their entirety.

One difficulty in adapting commercial biometric systems to databases such as motor vehicle databases is the very large number of images that may be stored in the database. Some types of biometrics technologies can produce high numbers of false positives (falsely identifying a match between a first image and one or more other images) when the database size is very large. High numbers of false positives are sometimes seen with large databases of facial images that are used with facial recognition systems.

Another potential problem with searching large databases of biometric images can be the processing delays that can accompany so-called "one to many" searches (comparing a probe image with an "unidentified" image, such as a face or finger image presented for authentication, to a large database of previously enrolled "known" images. In addition, the "many" part of "one-to-many" can vary depending on the application and/or the biometric being used. In some types of applications (such as surveillance, terrorist watch lists, authentication for admission to a facility), the "many" can be as few as a few hundred individuals, whereas for other applications (e.g., issuance of security documents, such as passports, drivers licenses, etc.), the "many" can be many millions of images.

Further, some types of biometric technologies, such as facial recognition, have a few key differences from other types of biometric technologies, such as fingerprint technologies. For example, one difference between face recognition systems and fingerprint recognition systems can be cost. At the present time, for one to many type searching in identification document environments (where "many" at least means a million or more records), facial recognition systems are far less costly than fingerprint recognition systems. The more affordable fingerprint recognition systems, at the present time, generally include those adapted for one to few type searching (where "few" at least means fewer than a million records and includes, for example, systems adapted for use with tens of thousands of records).

Another difference between facial recognition systems and fingerprint recognition (and other systems, such as iris and retina identification systems, voice recognition systems, etc.) systems can be the error rates. In an exemplary biometric identification system, a given image (referred to as the "probe image") is compared to one or more stored image to generate a candidate list of possible matches ordered by a match score. Like some types of automated fingerprint searches, at least some types of automated searches of facial images generate a candidate list of possible matches ordered by a match score. The score is a measure of the level of confidence that the probe facial image and a target image from the candidate list are portraits of the same person. With facial recognition systems, however, separating the true matches from the false matches can be much more difficult than with fingerprinting. Camera angles, angles at which the subject's head and/or eyes are turned, shadows, lighting, hats, glasses, beards, jewelry, etc., each have the potential to affect facial recognition results for at least some types of facial recognition systems. Thus, manual review of facial recognition results can be necessary.

Although face recognition systems can generate a relatively high percentage of matches in the candidate lists (with some facial recognition systems, the match percentage can be—90%), face recognition systems can also generate a very high number of false match results. Using a match threshold to define what constitutes a match may be less effective with face recognition than with other biometrics technologies (e.g., fingerprint recognition) because of the very high False Match Rates. Unless investigators are willing to manually verify matches in a face recognition candidate list, or a better technique is developed to differentiate between matches and non-matches, face recognition is likely to remain less effective than fingerprinting.

One measure of the accuracy of a given biometric systems is known as the Receiver Operating Curve (ROC). An ROC curve is a plot of a given systems False Match Rate (FMR) distribution against its False Non Match Rate (FNMR) distribution. Thus, ROC graphs for a given biometrics system show the relationship between the system's false match rate (a measure of the likelihood that the system will (incorrectly) match a subject with another, non-matching subject) and the false non-match rate (a measure of the likelihood that the system will fail to match a subject with another matching subject.)

In an office such as a Department of Motor Vehicles (DMV) office that utilizes one-to-many biometrics searching, the result of a false match for an applicant can be that the system identifies the person as matching the identity of another, different enrollee. The result of a false non-match for an applicant can be that the system fails to identify the person's additional, potentially fraudulent identities previously enrolled. Obviously, system implementers wish to minimize both false matches and false non-matches. However, ROC graphs may show that minimizing one problem tends to exacerbate the other. Tuning a biometrics system to identify the maximum number of possible fraudulent duplicate enrollees (minimizing false non-matches) may result in an increased number of enrollees being incorrectly identified as having multiple different identities (an increase of false matches). Conversely, a system tuned to minimize the number of applicants incorrectly identified as having multiple previously enrolled different identities will result in an increase in the number of possible fraudulent duplicate identities.

As noted previously, manual follow up searching is one way of augmenting biometric searching. A given biometrics search system can require verification of candidate lists because they will contain false matches, that is, subjects whom the system has falsely identified as matches. In some instances, the verification task is assigned to trained investigators who manually confirm each candidate's match. For example, the candidate list generated by a one-to-many fingerprint search would be manually checked by trained fingerprint analysts to eliminate the false matches contained in the list and verify the actual matches. Such follow up checking is time consuming and expensive.

We have discovered several techniques for augmenting and/or improving biometric search processes.

In a first aspect, we have found that a biometrics system that utilizes two different biometrics (a so-called "hybrid" biometrics system) can further automate and improve the biometrics search process, especially for (but not limited to) applications involving the production of identification documents such as drivers licenses. In one embodiment, the hybrid solution we propose combines the benefits of two biometric technologies: the speed of facial recognition and the accuracy of fingerprint matching. This blending of two biometrics can result in faster processing time and reduced costs. In one embodiment, this hybrid biometrics processing uses two different biometrics during the searching process, where the two different biometrics are used sequentially. The first biometric (e.g., a facial image) is used to retrieve a first set of results, and the first set of results are then searched using the second biometric (e.g., a fingerprint).

Depending on the particular pairing of biometric templates used, this process can provide a first biometric recognition process adapted for a one to many level "coarse" search to result in a candidate set of results that are usable by a second "one to few" type biometric recognition process. The set of results from the first biometric search process are therefore used by the second biometric search process. The inventors have found that use of two successive biometrics recognition processes (e.g., one to many facial for a first search, followed by one to (relatively) few fingerprint search) can significantly improve the accuracy of the overall recognition and may reduce the number of images that ultimately must be manually reviewed. This type of combination can result in higher accuracy searches at lower costs and/or in less time.

Selecting an appropriate combination also may result in higher accuracy searches at lower costs. For example, one to many fingerprint systems, at the present time, are so expensive that sometimes entities such as departments of Motor Vehicles (DMV's) cannot afford them, even though such one to many fingerprint searches often have desirable accuracy and may be easier to tune. In contrast, one to few fingerprint systems, at the present time, are significantly less expensive than one to many fingerprint systems, but are difficult to use with large databases. In contrast, one to many type facial recognition systems are relatively less expensive than one to many fingerprint systems, although they may be difficult to "tune" (as described above). In at least one embodiment of the invention, a system and method is provided that successively combines a one to many facial recognition system with a one to few fingerprint recognition system to achieve accuracy comparable to a one to many fingerprint system at about one third the cost of such a system.

This application describes additional inventive systems and methods for conducting biometrics searches and/or improving the accuracy of biometrics searching. We have found, for example, that using at least some of the returned biometric search results from a first initial probe image (whether or not the search is a hybrid type search) as second probe images can be used to "drill down" even further in the database and return even more high probability matches to the first probe image.

One embodiment provides a computerized system for determining whether a database contains an image substantially matching that of a given probe candidate. The system comprises an input device, a first database, a first biometric search engine, a second biometric search engine, and a processor. The input device is constructed and arranged to receive first and second biometric search templates associated with the probe candidate, the first biometric search template associated with a first type of biometric identifier and the second biometric search template associated with a second type of biometric identifier. The first database comprises a plurality of searchable biometric templates, the plurality of searchable biometric templates comprising a plurality of templates of the first type of biometric and a plurality of templates of the second type of biometric. The first biometric search engine is operably coupled to the input device and to the database and is adapted to search the database of searchable biometric templates for a match to the first biometric template and return a first set of results. The second biometric search engine is operably coupled to the input device and to the database and is adapted to search the database of searchable biometric templates for a match to the second biometric template and return a second set of results. The processor is in operable communication with the input device and the first and second biometric search engines. The processor programmed to compare the first and second sets of results to the first and second biometric templates to determine whether any result in the first set of results or the second set of results is a substantial match to either the first or second biometric search templates associated with the probe candidate.

Another embodiment provides a computer-implemented method for determining whether a database contains any images that substantially match at least one image provided of an individual. A probe data set is received, the comprising first and second biometric templates associated with the individual, the first biometric template associated with a different type of biometric than the second type of biometric template. A database of biometric templates is searched using the first biometric template to retrieve a first results set. A first predetermined portion of the first results set is selected. The first predetermined portion of the first results set is searched using the second biometric template to retrieve a second results set. A second predetermined portion of the second results set is selected. The second predetermined portion of the second results set is provided for comparison with the image provided of the individual.

One aspect of the invention provides a computer-implemented method for determining whether a database contains any images that substantially match an image associated with an individual, comprising:

(a) receiving an initial probe data set, the first probe data set comprising at least one of a biometric template associated with the individual and non-biometric data associated with the individual;

(b) searching a database of biometric templates using the initial probe data set to retrieve a results set, the results set comprising biometric templates that satisfy a predetermined first criteria;

(c) selecting a first portion of the results set to be a refined probe data set;

(d) searching the database of biometric templates using the refined probe data set to return a results set, the results set comprising biometric templates that satisfy the predetermined first criteria;

(e) repeating (c) and (d) and returning a final results set.

Another aspect of the invention provides a computer-implemented method for determining whether a database contains any images that substantially match those of an individual, comprising:

(a) receiving an initial probe data set, the first probe data set comprising first and second biometric templates associated with the individual;

(b) searching a database of biometric templates using the first biometric template to retrieve a first results set, the first results set comprising a data set for each individual who has a biometric template that satisfies a predetermined first criteria, the data set comprising biometric template information that is searchable using the second biometric template;

(c) selecting a first portion of the first results set that satisfy a match criteria;

(d) searching the first portion of the first results set using the second biometric template to retrieve a second results set, the second results set comprising a data set for individuals who have a biometric template that satisfies a predetermined second criteria, the data set comprising biometric template information that is searchable using the first and second biometric templates;

(e) selecting a first portion of the second results set to be a refined probe data set; and (f) searching the database of biometric templates using the refined probe data set to return a results set, the results set comprising biometric templates that satisfy a predetermined third criteria.

Another embodiment provides a method for locating images in a database, comprising:

receiving a first probe set, the first probe set comprising a non-biometric data record;

searching a database of data records for data records that substantially match the non biometric data record, the database of data records including, for each data record in the database, at least one biometric template associated with at least one image;

receiving a first results set from the search of the database, the results set comprising, for each substantial match to the non-biometric data record, a results set data record comprising a corresponding image and biometric template;

selecting at least one results set data record to use as a second probe set; and searching the database of data records for data records having biometric templates that substantially match the biometric record associated with the results set data record.

In still another aspect, the invention provides a method for determining whether an individual should receive an identification document, comprising:

receiving a probe set associated with the individual, the probe set comprising a first biometric template of a first type and a second biometric template of a second type;

performing a first search, the first search comprising searching a database of previously enrolled biometric templates for a biometric template that substantially matches the biometric template of the first type;

performing a second search, the second search comprising searching the database of previously enrolled biometric templates for a biometric template that substantially matches the biometric template of the second type; and analyzing the results of the first and second searches to determine whether any resulting matches indicate that the individual either is attempting to fraudulently obtain an identification document or has attempted to fraudulently obtain an identification document in the past.

The foregoing and other objects, aspects, features, and advantages of this invention will become even more apparent from the following description and drawings, and from the claims.

BRIEF DESCRIPTION OF THE DRAWINGS

The foregoing features of this invention, as well as the invention itself, may be more fully understood from the following description and the drawings in which.

Figure 1:
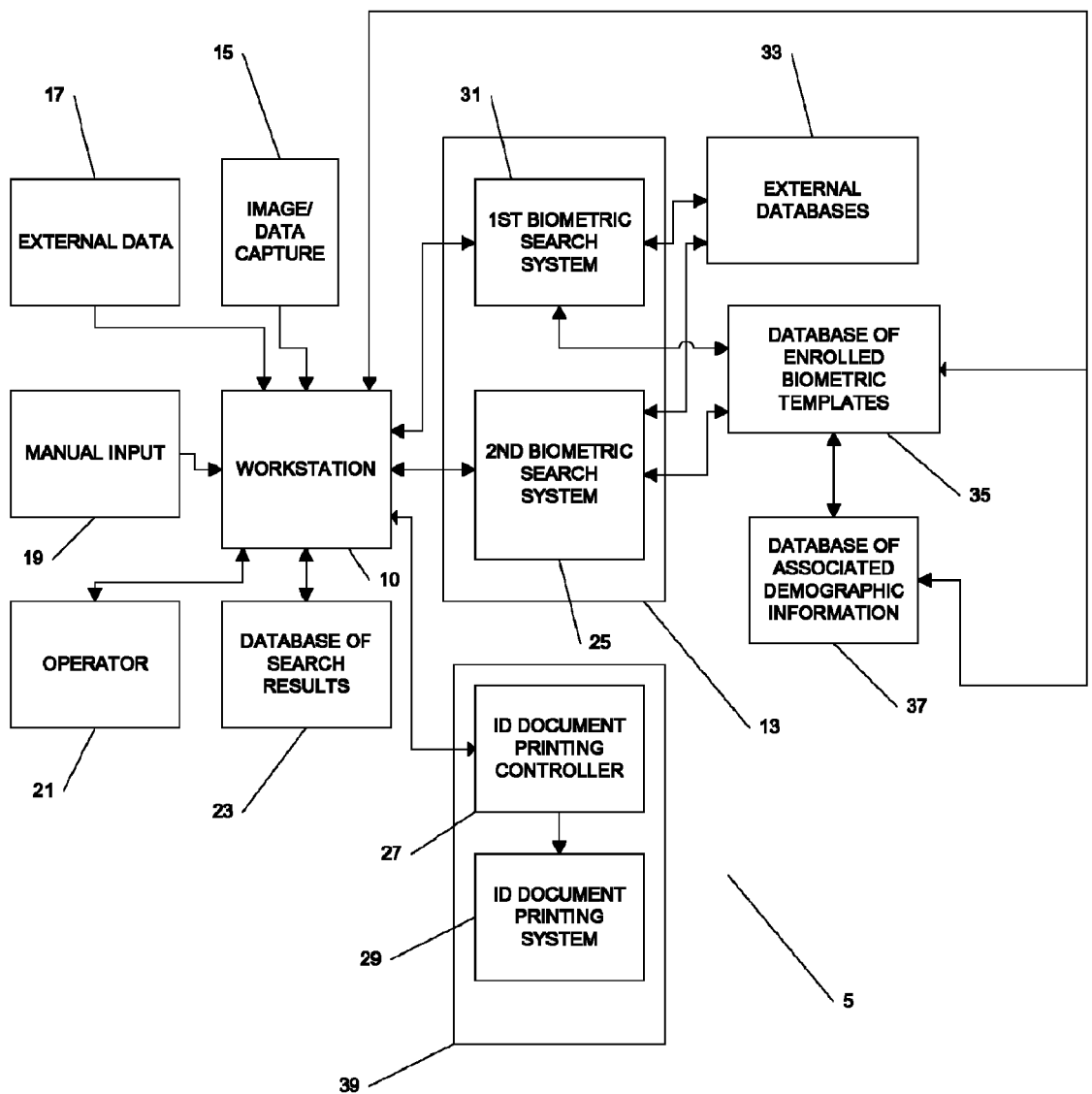
FIG. 1 is as block diagram of a first system for biometric searching, in accordance with one embodiment.

The drawings are not necessarily to scale, emphasis instead is generally placed upon illustrating the principles of the invention. In addition, in the drawings, like reference numbers indicate like elements. Further, in the Figures of this application, in some instances, a plurality of system elements or method steps may be shown as illustrative of a particular system element, and a single system element or method step may be shown as illustrative of a plurality of a particular systems elements or method steps. It should be understood that showing a plurality of a particular element or step is not intended to imply that a system or method implemented in accordance with the invention must comprise more than one of that element or step, nor is it intended by illustrating a single element or step that the invention is limited to embodiments having only a single one of that respective elements or steps. In addition, the total number of elements or steps shown for a particular system element or method is not intended to be limiting; those skilled in the art will recognize that the number of a particular system element or method steps can, in some instances, be selected to accommodate the particular user needs.

DETAILED DESCRIPTION

Before describing various embodiments in detail, it is helpful to define some terms used herein and explain further some of the environments and applications in which at least some embodiments can be used.

Identification Documents

In the foregoing discussion, the use of the word "ID document" or "identification document" or "security document" is broadly defined and intended to include all types of ID documents, including (but not limited to), documents, magnetic disks, credit cards, bank cards, phone cards, stored value cards, prepaid cards, smart cards (e.g., cards that include one more semiconductor chips, such as memory devices, microprocessors, and microcontrollers), contact cards, contactless cards, proximity cards (e.g., radio frequency (RFID) cards), passports, driver's licenses, network access cards, employee badges, debit cards, security cards, visas, immigration documentation, national ID cards, citizenship cards, social security cards, security badges, certificates, identification cards or documents, voter registration and/or identification cards, police ID cards, border crossing cards, security clearance badges and cards, legal instruments, gun permits, badges, gift certificates or cards, membership cards or badges, and tags. Also, the terms "document," "card," "badge" and "documentation" are used interchangeably throughout this patent application.). ID document can include any item of value (e.g., currency, bank notes, and checks) where authenticity of the item is important and/or where counterfeiting or fraud is an issue.

In addition, in the foregoing discussion, "identification" at least refers to the use of an ID document to provide identification and/or authentication of a user and/or the ID document itself. For example, in a conventional driver's license, one or more portrait images on the card are intended to show a likeness of the authorized holder of the card. For purposes of identification, at least one portrait on the card (regardless of whether or not the portrait is visible to a human eye without appropriate stimulation) preferably shows an "identification quality" likeness of the holder such that someone viewing the card can determine with reasonable confidence whether the holder of the card actually is the person whose image is on the card. "Identification quality" images, in at least one embodiment, include covert images that, when viewed using the proper facilitator (e.g., an appropriate light or temperature source), provide a discernable image that is usable for identification or authentication purposes.

Further, in at least some embodiments, "identification" and "authentication" are intended to include (in addition to the conventional meanings of these words), functions such as recognition, information, decoration, and any other purpose for which an indicia can be placed upon an article in the article's raw, partially prepared, or final state. Also, instead of ID documents, the inventive techniques can be employed with product tags, product packaging, business cards, bags, charts, maps, labels, etc., etc., particularly those items including marking of an laminate or over-laminate structure. The term ID document thus is broadly defined herein to include these tags, labels, packaging, cards, etc.

Many types of identification cards and documents, such as driving licenses, national or government identification cards, bank cards, credit cards, controlled access cards and smart cards, carry thereon certain items of information which relate to the identity of the bearer. Examples of such information include name, address, birth date, signature and photographic image; the cards or documents may in addition carry other variant data (i.e., data specific to a particular card or document, for example an employee number) and invariant data (i.e., data common to a large number of cards, for example the name of an employer). All of the cards described above will hereinafter be generically referred to as "ID documents".

As those skilled in the art know, ID documents such as drivers licenses can contain information such as a photographic image, a bar code (which may contain information specific to the person whose image appears in the photographic image, and/or information that is the same from ID document to ID document), variable personal information, such as an address, signature, and/or birthdate, biometric information associated with the person whose image appears in the photographic image (e.g., a fingerprint), a magnetic stripe (which, for example, can be on the a side of the ID document that is opposite the side with the photographic image), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

An exemplary ID document can comprise a core layer (which can be pre-printed), such as a light-colored, opaque material (e.g., TESLIN (available from PPG Industries) or polyvinyl chloride (PVC) material). The core is laminated with a transparent material, such as clear PVC to form a so-called "card blank". Information, such as variable personal information (e.g., photographic information), is printed on the card blank using a method such as Dye Diffusion Thermal Transfer ("D2T2") printing (described further below and also described in commonly assigned U.S. Pat. No. 6,066,594, which is incorporated herein by reference in its entirety.) The information can, for example, comprise an indicium or indicia, such as the invariant or nonvarying information common to a large number of identification documents, for example the name and logo of the organization issuing the documents. The information may be formed by any known process capable of forming the indicium on the specific core material used.

To protect the information that is printed, an additional layer of transparent overlaminate can be coupled to the card blank and printed information, as is known by those skilled in the art. Illustrative examples of usable materials for overlaminates include biaxially oriented polyester or other optically clear durable plastic film.

In the production of images useful in the field of identification documentation, it may be desirable to embody into a document (such as an ID card, drivers license, passport or the like) data or indicia representative of the document issuer (e.g., an official seal, or the name or mark of a company or educational institution) and data or indicia representative of the document bearer (e.g., a photographic likeness, name or address). Typically, a pattern, logo or other distinctive marking representative of the document issuer will serve as a means of verifying the authenticity, genuineness or valid issuance of the document. A photographic likeness or other data or indicia personal to the bearer will validate the right of access to certain facilities or the prior authorization to engage in commercial transactions and activities.

Identification documents, such as ID cards, having printed background security patterns, designs or logos and identification data personal to the card bearer have been known and are described, for example, in U.S. Pat. No. 3,758,970, issued Sep. 18, 1973 to M. Annenberg; in Great Britain Pat. No. 1,472,581, issued to G. A. O. Gesellschaft Fur Automation Und Organisation mbH, published Mar. 10, 1976; in International Patent Application PCT/GB82/00150, published Nov.

25, 1982 as Publication No. WO 82/04149; in U.S. Pat. No. 4,653,775, issued Mar. 31, 1987 to T. Raphael, et al.; in U.S. Pat. No. 4,738,949, issued Apr. 19, 1988 to G. S. Sethi, et al.; and in U.S. Pat. No. 5,261,987, issued Nov. 16 1993 to J. W. Luening, et al. All of the aforementioned documents are hereby incorporated by reference.

Commercial systems for issuing ID documents are of two main types, namely so-called "central" issue (CI), and so-called "on-the-spot" or "over-the-counter" (OTC) issue. CI type ID documents are not immediately provided to the bearer, but are later issued to the bearer from a central location. For example, in one type of CI environment, a bearer reports to a document station where data is collected, the data are forwarded to a central location where the card is produced, and the card is forwarded to the bearer, often by mail. In contrast to CI identification documents, OTC identification documents are issued immediately to a bearer who is present at a document-issuing station. An OTC assembling process provides an ID document "on-the-spot". (An illustrative example of an OTC assembling process is a Department of Motor Vehicles ("DMV") setting where a driver's license is issued to person, on the spot, after a successful exam.). Further details relating to various methods for printing and production of identification documents can be found in the following commonly assigned patent applications, which are hereby incorporated by reference in their entirety:

Identification Card Printed With Jet Inks and Systems and Methods of Making Same (application Ser. No. 10/289,962, Inventors Robert Jones, Dennis Mailloux, and Daoshen Bi, filed Nov. 6, 2002, Publication No. 2003-0211296);

Laser Engraving Methods and Compositions, and Articles Having Laser Engraving Thereon (application Ser. No. 10/326,886, filed Dec. 20, 2002, Publication No. 2003-0234286—Inventors Brian Labrec and Robert Jones);

Multiple Image Security Features for Identification Documents and Methods of Making Same (application Ser. No. 10/325,434, filed Dec. 18, 2002(now Pat. No. 6,817,530)—Inventors Brian Labrec, Joseph Anderson, Robert Jones, and Danielle Batey); and Identification Card Printer-Assembler for Over the Counter Card Issuing (application Ser. No. 10/436,729, filed May 12, 2003—Inventors Dennis Mailloux, Robert Jones, and Daoshen Bi).

Biometrics

Biometrics relates generally to the science of measuring and analyzing biological characteristics, especially those of humans. One important application of biometrics is its use in security-related applications, such as identification of an individual or authentication of an individual's identity by using measurable, individualized, and often unique, human physiological characteristics. Examples of human physiological characteristics that can be used as biometric identifiers include (but are not limited to) face, fingerprint (including use for both fingerprint recognition systems and Automated Fingerprint Identification Systems (AFIS)), thumbprint, hand print, iris, retina, hand geometry, finger geometry, thermogram (heat signatures of a given physiological feature, e.g. the face, where the image is captured using a device such as an infrared camera and the heat signature is used to create a biometric template used for matching), hand vein (measuring the differences in subcutaneous features of the hand using infrared imaging), signature, voice, keystroke dynamic, odor, breath, and deoxyribonucleic acid (DNA). We anticipate that any one or more of these biometrics is usable with the embodiments described herein.

The reader is presumed to be familiar with how each of the biometrics listed above works and how biometric templates are created with each method. We note, however, that embodiments can utilize many different types of information to create biometric templates. For example, to create face and/or finger templates, information that can be used may include (but is not limited to), law enforcement images (e.g., mug shots, fingerprint exemplars, etc.), print images from any source (e.g., photographs, video stills, etc.), digitized or scanned images, images captured at a capture station, information provided by other databases, and/or sketches (e.g., police sketches).

DETAILED DESCRIPTION OF THE FIGURES

FIG. 1 is a block diagram of a first system 5 for biometric searching, in accordance with one embodiment. The system 5 includes a workstation 10 (described more fully in FIG. 2) which is capable of receiving inputs from a number of sources, including image and/or data capture systems 15, external data systems 17 (such as remote clients in communication with the workstation 10 and/or which conduct searches using the workstation 10, data acquisition devices such as scanners, palm top computers, etc.), manual inputs 19 (which can be provided locally or remotely via virtually any input device, such as a keyboard, mouse, scanner, etc.), and operator inputs 21 (e.g., voice commands, selections from a menu, etc.). The workstation in this embodiment is programmed to convert captured images and/or received data into templates usable by the biometric search systems 31, 25 (described further below). However, those skilled in the art will appreciate that the function of converting captured data into biometric templates can, of course, be performed by a separate system (not shown). Biometric templates, after being created at (or otherwise inputted to) the workstation can be added to the database of enrolled biometric templates 25.

The system 5 also includes a biometric search system 13, which in this embodiment include a first biometric search system 31 and a second biometric search system 25. The first biometric search system 31 and the second biometric search system 25 each includes a respective search engine capable of searching the database of previously enrolled biometric templates 35. In at least one embodiment, the search engine of the first biometric search system 31 is a biometric search engine selected to search using a first type of biometric technology, such as facial recognition, and the search engine of the second biometric search system 25 is a biometric search engine selected to search using a second type of biometric technology, such as fingerprint recognition.

In one embodiment, the first biometric search system is system that is relatively economical, efficient, quick, and reasonably accurate for one-to-many type searching, such as a facial recognition system and the second biometric search system is a system (such as a fingerprint recognition system) that is very accurate and reasonably quick for one to few (or one to "not so many") searching, but which may be not as quick or inexpensive as the first biometric search system. For clarity in explanation, many of the embodiments described herein are explained using face and fingerprint biometrics; however, the invention is not so limited, and virtually any biometric can be usable. For example, in one embodiment, the first biometric search system is a facial recognition system employing a local features analysis (LFA) methodology, such as the FACE-IT facial recognition system available from Identix of Minnesota. Other facial recognition systems available from other vendors (e.g., Cognitec, Imagis, Viisage, Eyematic, VisionSphere, DreamMirth, C-VIS, etc.) are usable with at least some embodiments, as those skilled in the art will appreciate. In one embodiment, the second biometric search system is an AFIS or AFIS-lite compatible system available from NEC. Other fingerprint recognition systems available from other vendors (e.g., BioScript, SecuGen, Identix, Digital Persona, Sagem, Motorola, BAC, Indivos, etc.), including both AFIS and non-AFIS type systems, are, of course, usable (note that AFIS systems can sometimes be restricted to use by law enforcement personnel only).

The system 5 also includes a biometric template database 25 comprising previously enrolled biometric templates 35 and a demographic database 37 comprising demographic information 37 associated with each respective biometric template in the biometric template database 25. For example, in one embodiment, the biometric template database 25 and demographic database 37 are associated with a plurality of records of individuals who have obtained an identification document (e.g., a driver's license) in a given jurisdiction. Either or both of the biometric template database 25 and demographic database 37 can be part of a database of official records (e.g., a database maintained by an issuer such as a department of state, department of motor vehicles, insurer, employer, etc.). In some embodiments, the system 5 further includes a search results database 23 for storing the results of searches conducted by the workstation 10.

As those skilled in the art will appreciate, the search results database 23, biometric template database 25 and the demographic database 37 can be implemented using any type of memory device capable of storing data records or electrical signals representative of data and permitting the data records or electrical signals to be retrieved, including but not limited to semiconductor memory devices (e.g., RAM, ROM, EEPROM, EPROM, PROM, etc), flash memory, memory "sticks" (e.g., those manufactured by Sony), mass storage devices (e.g., optical disks, tapes, disks), floppy disk, a digital versatile disk (DVD), a compact disk (CD), RAID type memory systems, etc.

Referring again to FIG. 1, in at least some embodiments, the system 5 includes an image/data capture system 15, which can be any system capable of acquiring images and/or data that can be used (whether directly or after conversion to a template) for biometric system. The particular elements of the image/data capture system 15 will, of course be dependent on the particular biometrics used. For example, signature pads may be used to acquire signatures of individuals, camera systems may be used to acquire particular types of images (e.g., facial images, iris images), retinal scanners may be used to acquire retinal scans, fingerprint scanning and capture devices may be used to capture fingerprint images, IR cameras can acquire thermogram images, etc. Those skilled in the art will readily understand what particular pieces of equipment may be required to capture or otherwise acquire a given piece of data or a given image.

In an advantageous embodiment, the image/data capture system 15 can be implemented to automatically locate and capture biometric information in an image that it receives. For example, in one embodiment that implements a face recognition biometric, we utilize proprietary Find-A-Face™ software available from the assignee of the present invention (Digimarc Corporation of Burlington, MA). Find-A-Face™ software has the intelligence to automatically (without the need for any operator intervention):
   (i) follow a multitude of instructions and extensive decision and judgment logic to reliably perform the difficult task of locating human faces (with their many variations) within captured digital data (a digital picture);
   (ii) once the particular human face is found within the captured digital data, evaluate multiple aspects of the found human face in the image;
   (iii) determine, based upon this face location and evaluation work, how the system should position the human face in the center of the digital image, adjust the gamma level of the image, and provide contrast, color correction and color calibration and other related adjustments and enhancements to the image; and
   (iv) repeatedly and reliably implement these and other functions for the relatively large volume of image captures associated with producing a large volume of identification documents In another advantageous embodiment, we have found that biometric templates created based on the data captured using the image/data capture system 15 can be further improved by utilizing of various methods to improve finding particular biometric features, such as eyes, can further be used to improve the performance of biometric searches that use facial recognition. For example, in one embodiment we use systems and methods described in commonly assigned provisional patent application No. 60/480,257, entitled "Systems and Methods for Detecting Skin, Eye Region, and Pupils," the contents of which are hereby incorporated by reference in their entirety. The systems and methods described in this patent application are, in one embodiment, implemented using a computer, such as the workstation 10.

Referring again to FIG. 1, in at least some embodiments the workstation 10 can be in operable communication with an ID document production system 39, which can, for example, include a printer controller 27 that controls the printing of ID documents by an ID document printing system 29. The ID document production system 39 can, for example, be a CI or OTC type document production system (as described previously and also as described in commonly assigned U.S. patent application Ser. No. 10/325,434, entitled "Multiple Image Security Features for Identification Documents and Methods of Making Same".) In at least some embodiments, the workstation 10 communicates with the ID document production system 39 to control whether or not a given ID document will be created (for issuance to an individual) based on the results of biometric searching.

Figure 2:
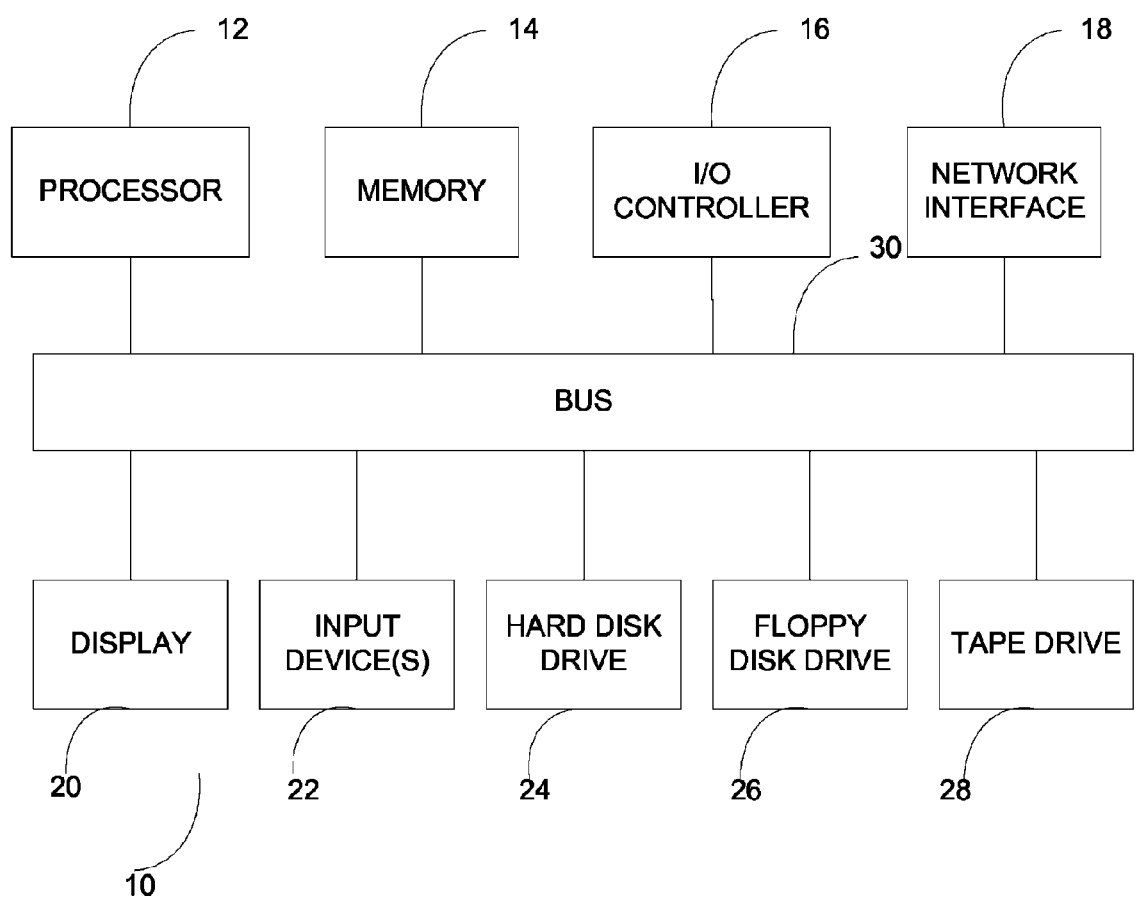
FIG. 2 is a block diagram of a computer system usable in the embodiment of FIG. 1.

Systems and methods described herein in accordance with the invention can be implemented using any type of general purpose computer system, such as a personal computer (PC), laptop computer, server, workstation, personal digital assistant (PDA), mobile communications device, interconnected group of general purpose computers, and the like, running any one of a variety of operating systems. As noted previously, the workstation 10 can, for example, be a computer system. FIG. 2 is a block diagram of a computer system usable as the workstation 10 in the embodiment of FIG. 1.

Referring briefly to FIG. 2, the workstation 10 includes a central processor 12, associated memory 14 for storing programs and/or data, an input/output controller 16, a network interface 18, a display device 20, one or more input devices 22, a fixed or hard disk drive unit 24, a floppy disk drive unit 26, a tape drive unit 28, and a data bus 30 coupling these components to allow communication therebetween.

The central processor 12 can be any type of microprocessor, such as a PENTIUM processor, made by Intel of Santa Clara, Calif. The display device 20 can be any type of display, such as a liquid crystal display (LCD), cathode ray tube display (CRT), light emitting diode (LED), and the like, capable of displaying, in whole or in part, the outputs generated in accordance with the systems and methods of the invention. The input device 22 can be any type of device capable of providing the inputs described herein, such as keyboards, numeric keypads, touch screens, pointing devices, switches, styluses, and light pens. The network interface 18 can be any type of a device, card, adapter, or connector that provides the computer system 10 with network access to a computer or other device, such as a printer. In one embodiment, the network interface 18 enables the workstation 10 to connect to a computer network such as the Internet.

Those skilled in the art will appreciate that computer systems embodying the present invention need not include every element shown in FIG. 2, and that equivalents to each of the elements are intended to be included within the spirit and scope of the invention. For example, the workstation 10 need not include the tape drive 28, and may include other types of drives, such as compact disk read-only memory (CD-ROM) drives. CD-ROM drives can, for example, be used to store some or all of the databases described herein.

In at least one embodiment of the invention, one or more computer programs define the operational capabilities of the workstation 10. These programs can be loaded into the computer system 10 in many ways, such as via the hard disk drive 24, the floppy disk drive 26, the tape drive 28, or the network interface 18. Alternatively, the programs can reside in a permanent memory portion (e.g., a read-only-memory (ROM)) chip) of the main memory 14. In another embodiment, the workstation 10 can include specially designed, dedicated, hard wired electronic circuits that perform all functions described herein without the need for instructions from computer programs.

In at least one embodiment, the workstation 10 is networked to other devices, such as in a client-server or peer to peer system. For example, referring to FIG. 1, the workstation 10 can be networked with an external data system 17. The workstation 10 can, for example, be a client system, a server system, or a peer system. In one embodiment, the invention is implemented at the server side and receives and responds to requests from a client, such as a reader application running on a user computer.

The client can be any entity, such as a the workstation 10, or specific components thereof (e.g., terminal, personal computer, mainframe computer, workstation, hand-held device, electronic book, personal digital assistant, peripheral, etc.), or a software program running on a computer directly or indirectly connected or connectable in any known or later-developed manner to any type of computer network, such as the Internet. For example, a representative client is a personal computer that is x86-, PowerPC.RTM., PENTIUM-based, or RISC-based, that includes an operating system such as IBM-.RTM., LINUX, OS/2.RTM. or any member of the MICROSOFT WINDOWS family (made by Microsoft Corporation of Redmond, Washington) and that includes a Web browser, such as MICROSOFT INTERNET EXPLORER, NETSCAPE NAVIGATOR (made by Netscape Corporation, Mountain View, Calif.), having a Java Virtual Machine (JVM) and support for application plug-ins or helper applications. A client may also be a notebook computer, a handheld computing device (e.g., a PDA), an Internet appliance, a telephone, an electronic reader device, or any other such device connectable to the computer network.

The server can be any entity, such as the workstation 10, a computer platform, an adjunct to a computer or platform, or any component thereof, such as a program that can respond to requests from a client. Of course, a "client" can be broadly construed to mean one who requests or gets the file, and "server" can be broadly construed to be the entity that sends or forwards the file. The server also may include a display supporting a graphical user interface (GUI) for management and administration, and an Application Programming Interface (API) that provides extensions to enable application developers to extend and/or customize the core functionality thereof through software programs including Common Gateway Interface (CGI) programs, plug-ins, servlets, active server pages, server side include (SSI) functions and the like.

In addition, software embodying at least some aspects of the invention, in one embodiment, resides in an application running on the workstation 10. In at least one embodiment, the present invention is embodied in a computer-readable program medium usable with the general purpose computer system 10. In at least one embodiment, the present invention is embodied in a data structure stored on a computer or a computer-readable program medium. In addition, in one embodiment, an embodiment of the invention is embodied in a transmission medium, such as one or more carrier wave signals transmitted between the computer system 10 and another entity, such as another computer system, a server, a wireless network, etc. The invention also, in at least one embodiment, is embodied in an application programming interface (API) or a user interface. In addition, the invention, in at least one embodiment, can be embodied in a data structure.

Figure 3:
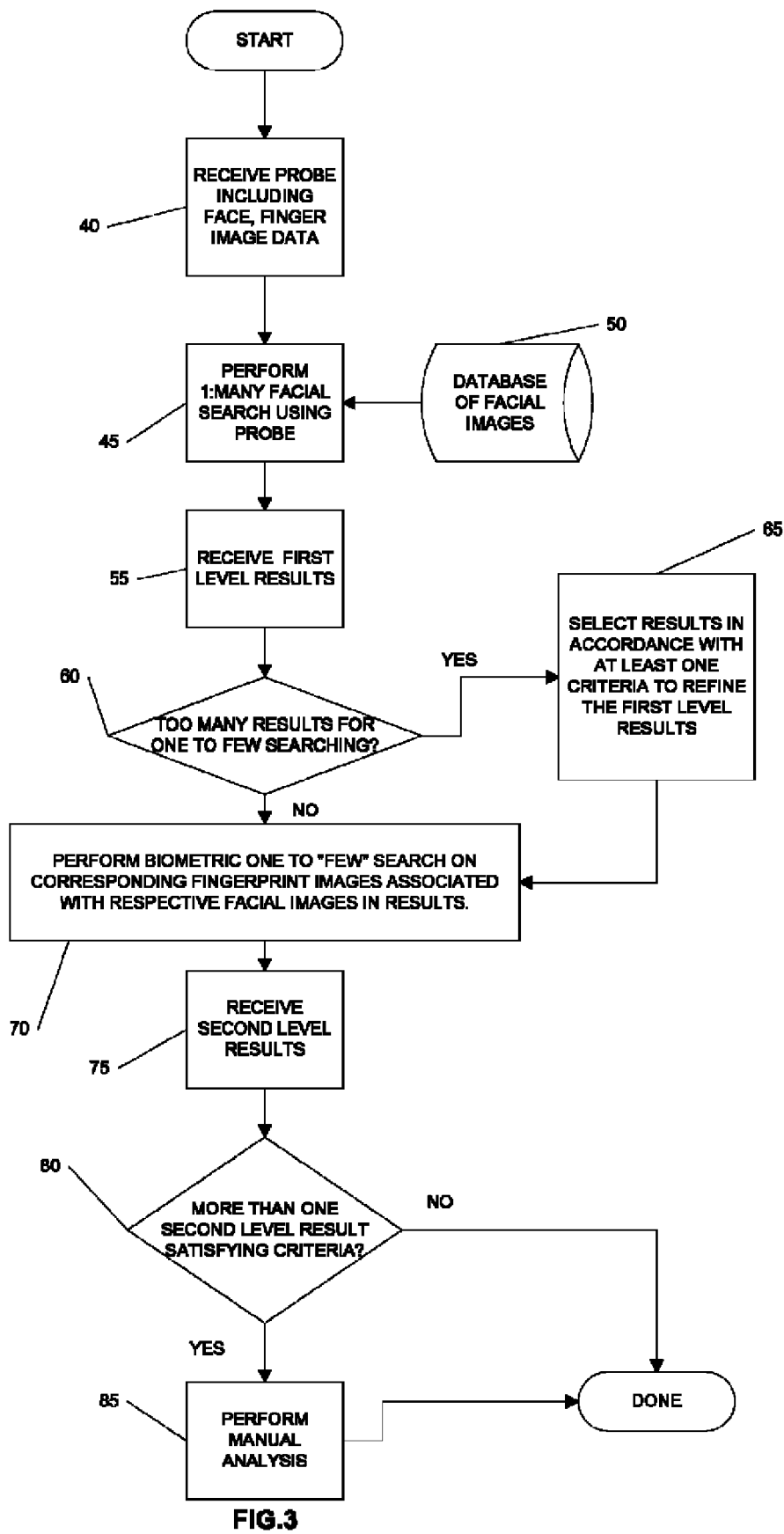
FIG. 3 is a flow chart of a first method for conducting a biometric search, in accordance with one embodiment.

FIG. 3 is a flow chart of a first method for conducting a biometric search, in accordance with one embodiment. The method of FIG. 3 is an illustrative example of one embodiment of our "hybrid" biometrics searching system. The embodiment of FIG. 3 uses two different biometrics (shown for illustrative purposes only to be face and fingerprint) to help determine whether an individual's biometric images match one or more previously enrolled images. However, it should be understood that the two biometrics used in the method of FIG. 3 can be any two biometrics, e.g. face and iris, retina and finger, etc. The method of FIG. 3 can be used to help detect when a single individual has multiple records in a database, whether or not such multiple records are appropriate—such as previous legitimate records associated with an individual (e.g., images taken of an individual over the years as an individual renews a driver's license). The method of FIG. 3 likewise can be used to confirm that a single individual has no other non-authorized records in a database. Sometimes the multiple records of the individual can be present in the database through error or by accident. However, in some instances the multiple records of the individual can be present in the database because of fraud, including fraud by the individual and/or fraud by others attempting to use the personal information of the individual (e.g., identity theft).

The method of FIG. 3 also can be used to help to authenticate an individual presenting himself or herself by confirming that the biometric information that the individual provides matches biometric information stored in the individual's data records.

Figure 4:
FIGS. 4A-4B are illustrative examples of images used to create a probe set and images and returned results from a search using one of the images of FIG. 4A, respectively, for the method of FIG. 3.
Figure 4:
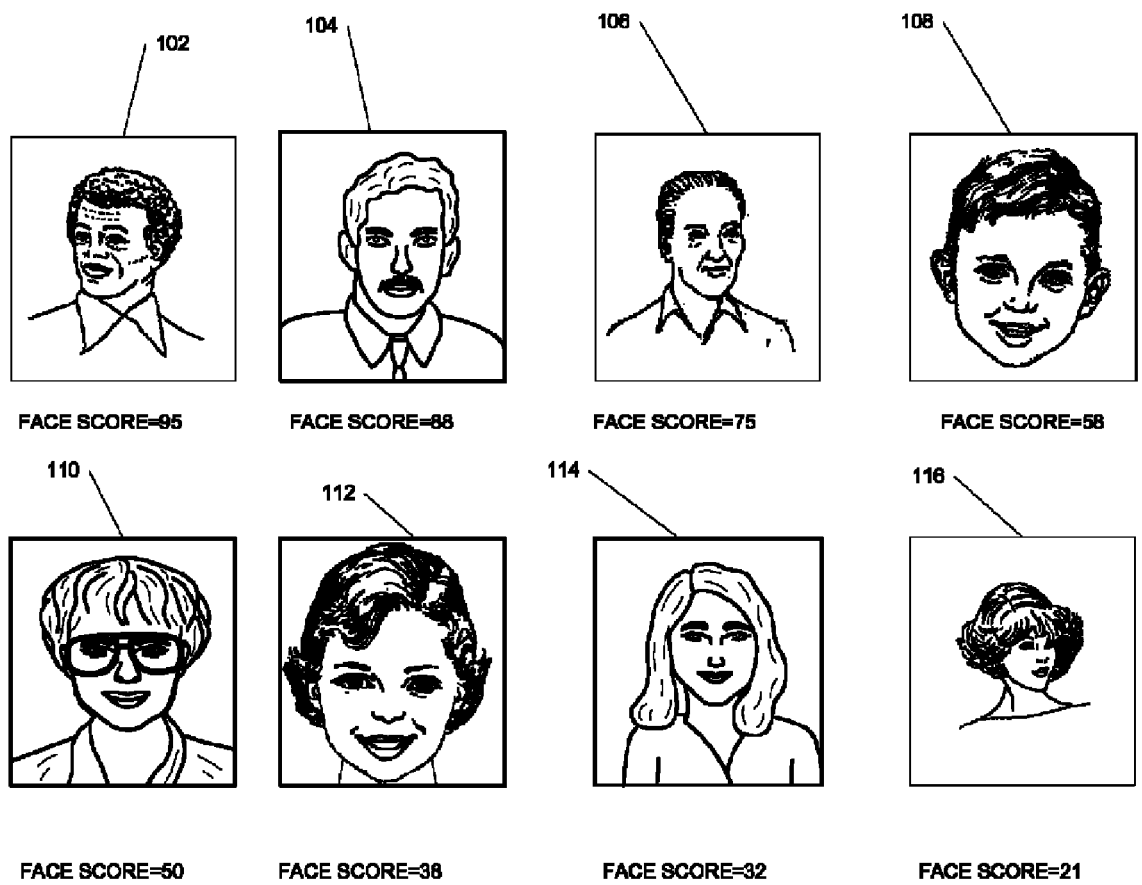

Referring to FIG. 3, a probe set is received at the workstation 10 (step 40). The probe set comprises one or more biometric templates associated with an individual. FIG. 4A is an illustrative example of face and fingerprint images that are used to create a probe set usable with the method of FIG. 3. Referring again to FIGS. 1 and 3, the workstation 10 sends one biometric from the probe set to the first biometric search system 31. In this example, the first biometric search system performs a one to many facial search (step 45). The one to many facial search can include searching one or more of the biometric template database 35, an external database 33, or a database of facial images 50 (FIG. 3).

When the search is complete, the first biometric search system returns first level search results (step 55) to the workstation 10. FIG. 4B is an illustrative example of part of the search results 102 through 116 that could be returned as part of step 55 (note that the total number of search results and the type of search results provided are provided by way of example only and are not limiting). Each search result 102 through 116 of FIG. 4B can also include other data (e.g., other biometrics such as fingerprints, demographic data, etc.) from the data record associated with each search result. For simplicity of illustration, this additional data is not illustrated in FIG. 4B. In the example of FIG. 4B, the search results 102 through 116 are each returned with a "Face Score" indicating a degree of match to the probe image 100. As the search results 102 through 116 illustrate, images that appear to substantially match the probe image generally (but not necessarily) will score higher than those images that do not appear to substantially match. The images of FIG. 4B may or may not be displayed to an operator 21 of the system 5; this can depend, in one embodiment, on how many results are retrieved. For example, in one embodiment, the results returned in step 55 can be many hundreds of thousands of images, which may be impractical for the operator 21 to review.

Note that in at least some embodiments, the one to many biometric search performed in step 45 can itself comprise more than one search or "pass" of the database it is searching. For example, some facial recognition search systems, such as the Identix FACE IT product, can utilize one or more biometric facial templates as part of its searching. For example, one implementation of the FACE IT product employs a first facial biometric template (a so-called "vector template") of about 84 bytes, for "coarse" searching, followed by a "fine" search using a larger second facial biometric template of about 3500 bytes. Thus, in one embodiment, the one to many facial search of step 45 actually comprises two search passes, one using the 84 byte template and the other using the 3500 byte template. Depending on the processing power available to conduct the searching, the time for this search may be quick or may be relatively long. In another embodiment, the 1: many facial search step 45 of FIG. 3 actually utilizes only one or the other of the 84 and 3500 byte templates. Using just one of the templates can help to increase the overall search speed, especially for large databases. For example, using the small (84-byte) facial recognition template and parallel processing techniques, a single individual can be matched against a relatively large (e.g., a million or more records) database of faces in less than fifteen seconds.

Referring again to FIGS. 1, 3, and 4, if the number of first level results are considered to be too great for efficient searching using the second biometric (step 60), a variety of criteria can be used to refine and/or selectively eliminate some of the results (step 65). One example of such criteria is selecting only those results above a particular threshold (step 65). For example, for the results of FIG. 4B, the threshold might be set to be all results having a face score of 75 or greater; therefore, results 108 through 116 would be discarded and results 102 through 106 would be retained. The criteria need not be solely based on a criterion such as a threshold face score, however. For example, in one embodiment the threshold could comprise automatic selection of certain number (either an absolute number, e.g., the top 100, or a specific percentage, e.g., the top 10%) of the results returned in step 55.

Combination criteria also are possible (e.g., the top 10% or top 100, whichever is smaller, the top 10% that also meet another requirement, such as enrollment within the last 5 years, etc.). Criteria for refining the first level result can even be based upon (or weighted using) known or suspected fraud patterns. For example, if it is determined that a given record is more likely to be fraudulent if it was enrolled by a certain issuing office in a high fraud area, then (all other things being equal) that record is more likely to appear on the refined list. As another example, if it is determined that a given group of records are more likely to be fraudulent if they are all enrolled within a brief time period, then these records may be weighted to rank higher in the group that is ultimately part of the refined results set.

Virtually any criteria of interest can be used to select results, and we anticipate that even dynamic criteria (e.g., criteria based on the actual results received) can be usable. For example, the criteria can dynamically change to reflect the face score distribution (or any other biometric match score distribution) of the results. Consider a situation where a probe image returns a set of 10,000 results, and all but 30 of the returned results have a match score distribution that is extremely low (e.g., under 20). A criteria that normally chooses the top 100 or top 10% of the returned results can be overridden to select only the returned results that also meet another criteria (e.g., a minimum match score) when the match scores on the returned results indicate that the majority of returned results are not close matches. This can speed up searching and/or improve searching accuracy. Such a result cannot be known in advance, but the method of FIG. 3 can be adapted to accommodate these types of variations in results.

Those skilled in the art will appreciate that these types of criteria are merely illustrative and not exhaustive, and that criteria can be created and used based on a given need.

Figure 5:
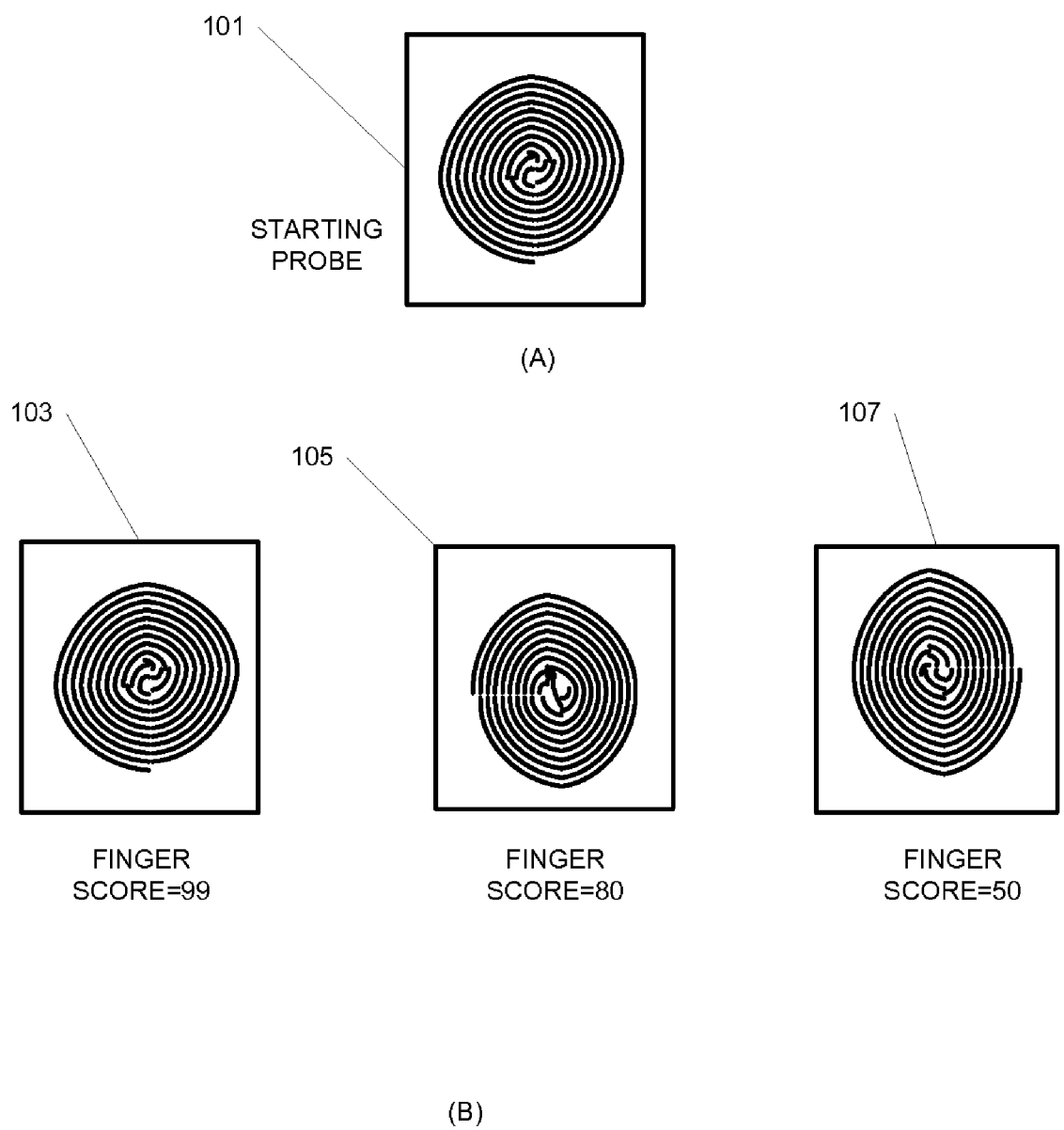
FIGS. 5A-5B are additional illustrative examples of an image used to create a probe set and returned results from a search using the image of FIG. 5A and the method of FIG. 3, respectively.

Referring again to FIGS. 1, 3, and 4, the refined set of first level results is then searched using the second biometric template (step 70) to return a second set of results (step 75). In the example of FIG. 3, the second biometric template is a template related to a fingerprint, but this is not limiting. FIG. 5A is an illustrative example of a second biometric image 101 associated with a biometric template that is used in step 70. FIG. 5B is an illustrative example of a second results set 103-107 returned in step 75. As FIG. 5B illustrates, the first result 103 has a finger score of 99, which may indicate that the returned fingerprint is a very close match to the probe fingerprint. Referring again to FIG. 3, in one embodiment, where the results set of step 74 includes more than one result that satisfies a predetermined criteria (step 80) (e.g., more than one result having a match score of 80 or greater), additional manual analysis of the returned images may be necessary (step 85) to help determine whether a match has been detected. Note that the criteria for step 80 can be as varied as the criteria previously discussed in connection with step 65. FIGS. 5A-5B are additional illustrative examples of probe images and returned results, respectively, for the system of FIG. 3.

Figure 6:
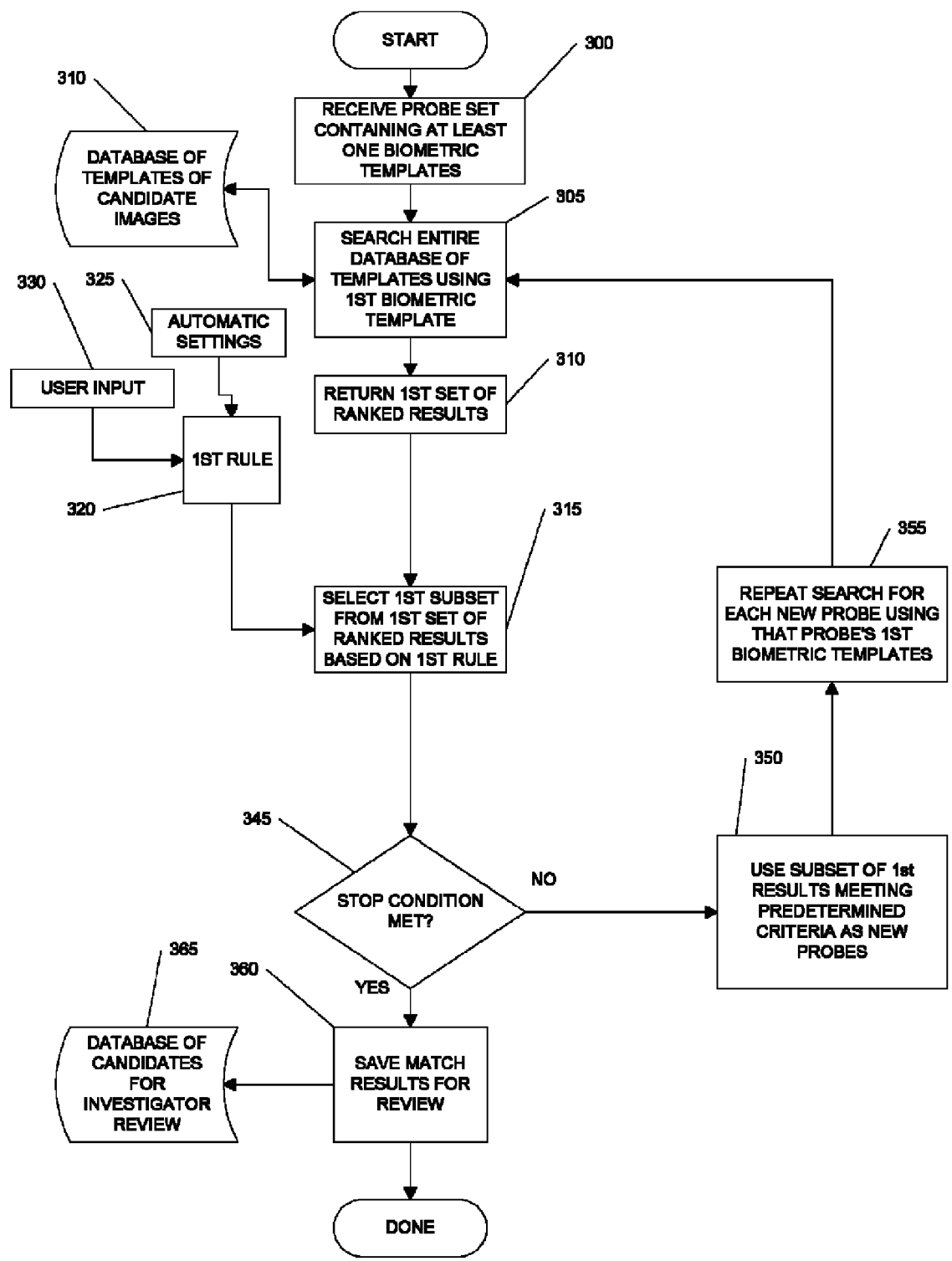
FIG. 6 is a flow chart of a second method for conducting a biometric search, in accordance with at least some embodiments.

We have also discovered other techniques for improving the accuracy, reliability, and/or efficiency of biometric searching. At least some of these techniques also involve multiple biometric searches. During our testing of various biometric searching systems, we have fount that in at least some instances, when we use one or more of the "closest" matches to an original probe as a probe itself, this "new" probe can itself be used find additional good matches to the original probe, and these matches can also be used as further probes, and so on. FIG. 6 is a flow chart of a second method for conducting a biometric search, in accordance with one embodiment. In FIG. 6, a type of progressive searching (which is sometimes referred to as "drill down") can be used to refine the search process and improve search accuracy.

Referring to FIG. 6, after a probe set containing at least one biometric template is received (step 300), the database is searched using the biometric template (step 305), and a first set of ranked results is returned (step 310). A subset of the first results is selected (step 315), based on a first rule (step 320) to be used as additional probes. The first rule can be similar to the criteria described for step 65 of FIG. 3. In one embodiment, as shown in FIG. 6, the first rule can be based on one ore more of predetermined/automatic system settings (step 325) (e.g., a threshold) and user input (step 330). For example, user input may be useful where manual review of results helps to select the best images to be used as new probes. In at least some embodiments, steps 300 through 315 can be conducted in a "batch" mode with results awaiting manual user input in step 330, then the remaining steps can later be performed in "batch" mode.

After the subset of the first results is selected, providing a stop condition has not been reached (step 345), the subset is used as new probes and the search process is repeated until the stop condition is reached (steps 350, 350). Stop conditions can be any condition that is deemed sufficient to stop the search. For example, a stop condition can be one or more of the following conditions:

(i) no matches are retrieved that meet a predetermined criteria;
(ii) all matches that are retrieved have been retrieved previously (e.g., no "new" matches);
(iii) a predetermined number of searches has been reached (e.g., steps and 355 have been repeated a predetermined number of times);
(iv) a substantial portion of the results set comprises biometric templates that have been retrieved in at least one previous results set;
(v) an instruction to stop searching (e.g., manual or automatic interrupt) is received.

Other types of stop conditions are, of course, usable. When the stop condition is met (step 345), the results can be saved for review by an investigator (steps 360, 365). Investigator review can include, for example, detailed comparison of the original probe image with the retrieved image, including comparisons of information such as demographic information. This can be helpful in detecting fraud and/or error; for example, a individual may have a matching image in the database but differing personal data (e.g., demographic data), which could be due to issuer error (e.g., incorrectly entering a record), or attempted fraud.

In some instances, other actions may take place after the results are saved, depending on the application in which the method of FIG. 6 is used. For example, if the method of FIG. 6 is used to determine if an individual's record is in a database more than once (for the purposes of fraud or error detection prior to issuance of an ID document), and the searching of FIG. 6 produces no matches meeting a required criteria, the individual can be automatically permitted to receive an ID document. In another example, if the method of FIG. 6 is used to determine if an individual's record is in a database at all (such as for identification of the user, such as to grant admittance to a secure facility), then if the searching of FIG. 6 produces no matches meeting a required criteria, the individual can be denied entry to the facility.

Figure 8:
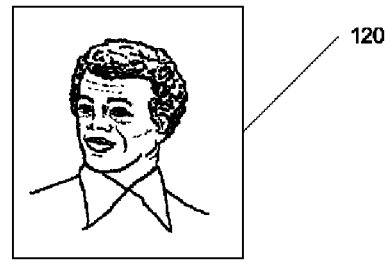
FIGS. 8A-8B are illustrative examples of probe images and returned results, respectively, for the system of FIG. 6.
Figure 8:
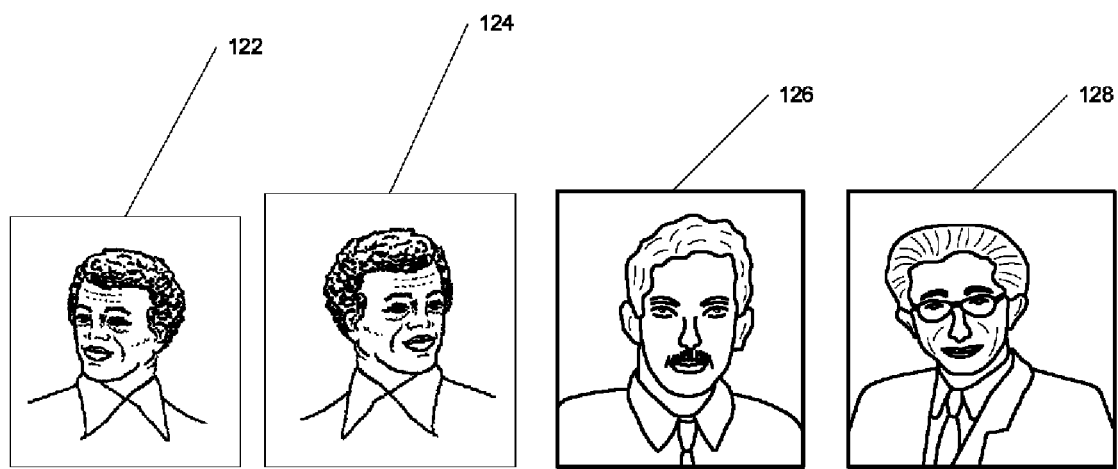
Figure 9:
FIG. 9A-9B are a side by side comparison of a probe image and a retrieved image, respectively, including demographic and biometric data, for the system of FIG. 6 and the results of FIGS. 8A-8B.
Figure 9:
Figure 9:
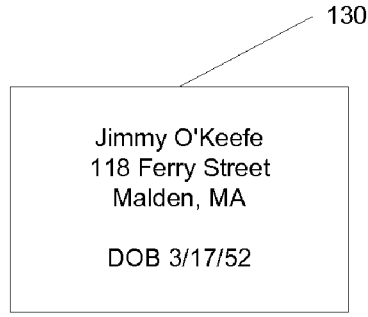
Figure 9:
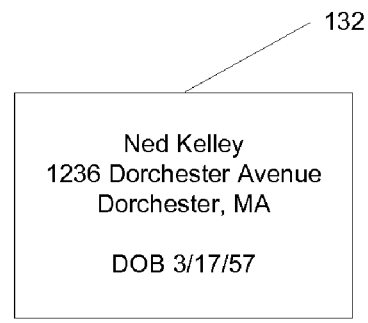
Figure 9:
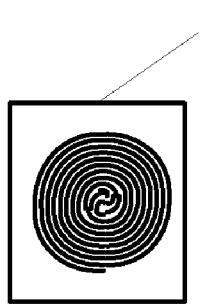
Figure 9:
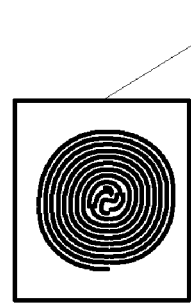

As an illustrative example of the FIG. 6 method's operation, assume that the facial image 100 of FIG. 4A was used to generate a biometric probe for step 300 of FIG. 5A, and assume that the results 102 through 116 of FIG. 4B were received as the first set of ranked results of step 310. Assume that the first rule (step 320) is that results in the first set of ranked results having a face score greater than or equal to 90 are to be selected from the first set of ranked results and used as the first subset of step 315. In the results of FIG. 4B, that would mean that the result image 102 (the only result having a score greater than or equal to 90) is used to generate a new biometric probe to search the database (steps 540 and 550 of FIG. 6). An illustrative example of the results that can be retrieved using the result image 102 as a probe can be seen in FIG. 8B. As the results 122 through 128 of FIG. 8B show, use of the "new" probe 102 has returned results that may be a closer match to the original probe 100 than were the original results. In fact, at least one of the results of FIG. 8B (namely, result 124) was not retrieved in the first set of results of FIG. 4B, but was retrieved in the results set of 8B, and is clearly a good match to the original probe image. Detailed information relating to the probe image and the retrieved results can be compared, as shown in FIGS. 9A and 9B, which shows the probe image 120, demographic data 130 and fingerprint 134 of the probe image in a side by side comparison with one of the result images (namely, result image 124). As FIGS. 8A and 8B show, although the facial appearance and fingerprint appear to be substantially identical, the personal information is clearly not matching. An investigator can determine whether this is due to error or fraud.

Figure 7:
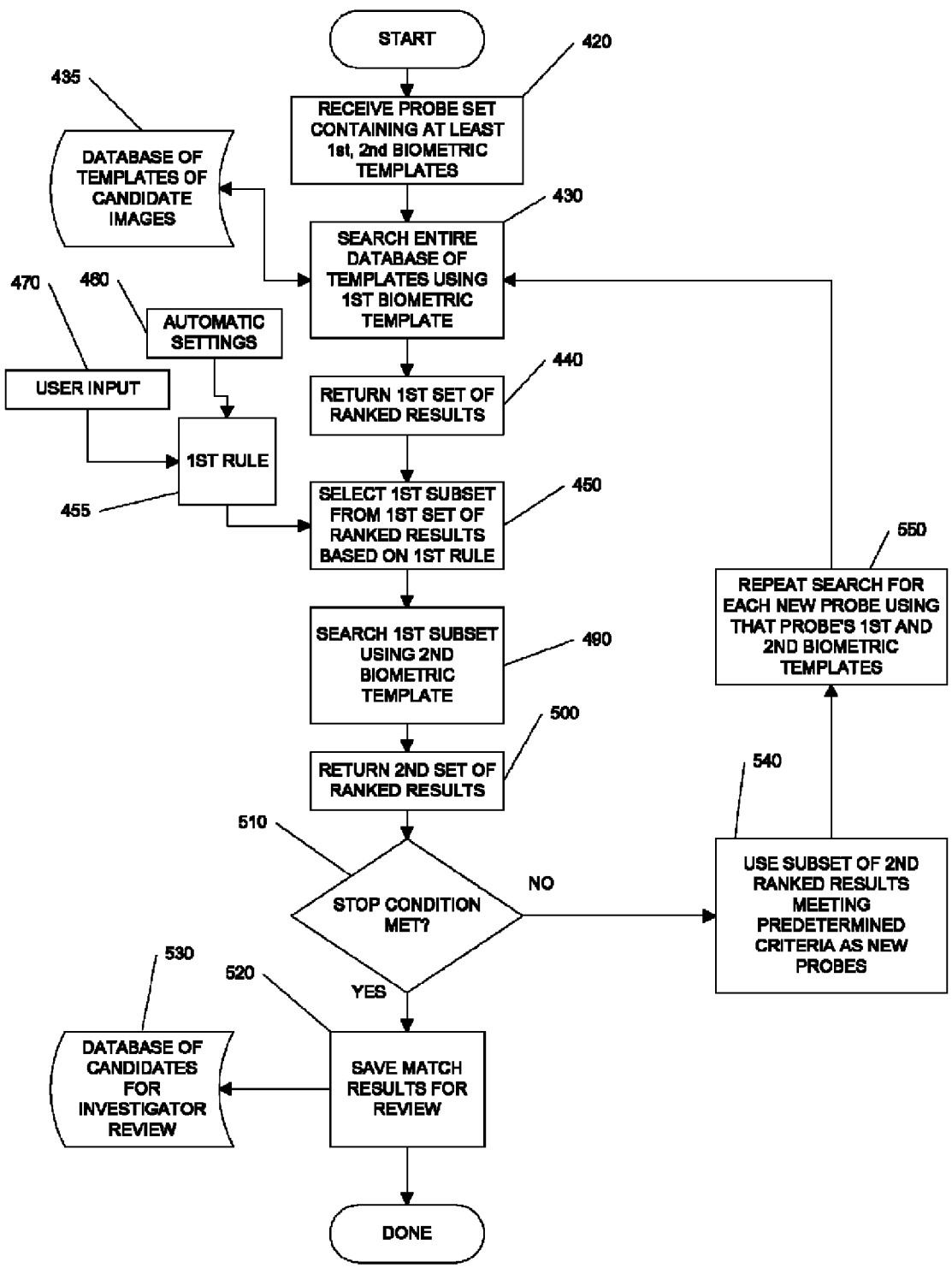
FIG. 7 is a flow chart of a third method for conducting a biometric search, in accordance with at least some embodiments.

The method of FIG. 6 can also be adapted to systems using more than one biometric template, as shown in FIG. 7. The method of FIG. 7 is substantially similar to the method of FIG. 6 except that a second biometric (steps 490 and 500) is used to help generate a probe set that is used for "drill down" searching. In this probe set, both the first and second biometrics are used as the method repeats steps 430-510.

We have found that this use of results as additional probes can be advantageous especially for face recognition systems. Sometimes, a given facial recognition probe does not retrieve all legitimate matches to it, even if such matches exist in the database. This can be due to many factors, including but not limited to factors which can affect biometric template creation of the face, such as facial expression, head tilting, aging, hair covering a facial feature, etc., any or all of which can sometimes affect search accuracy. Consider a situation where a starting probe image shows an individual whose head is tilted enough to change the eye alignment of that individual's face as compared to another image of the same individual when the individual's head is not tilted. Because eye location is very important to many types of facial recognition biometric systems, even minor changes in eye alignment may affect the types of search results that are retrieved.

Consequently, a biometric template created based on a "tilted head" image might not retrieve all images of the same individual in a database, especially images where the individual's head is tilted in a different way, or is untilted, etc. Such a template might, however, might retrieve at least one duplicate image (and associated record) for the individual (such as an image where the individual's head is slightly tilted, but not as much as in the original image). That retrieved image might be of a quality such that it can create a slightly different biometric template, which may result in a different (and, potentially more accurate) set of results to be retrieved. Of course, this is but one example, and those skilled in the art will appreciate that a given result used as a new probe may return results that are more or less closely matched to an original image, and for widely varying reasons.

We have also found that the methods of FIGS. 6 and 7 can be adapted for many different types of criteria and applications. For example, in one embodiment, step 540 of the method of FIG. 7 can be replaced with a step that involves manual selection of a subset. In one embodiment, step 540 of FIG. 7 (or step 350 of FIG. 6) can be replaced with a step that involves selecting a subset of the second set of ranked results based on substantially matching non-biometric data. For example, one or more results retrieved may have substantially similar non-biometric data (e.g., birthdate and address) to that of the probe (or even to that of other retrieved results). Having a returned result present a low biometric match score but still having some data that match can, in some instances indicate that an individual has permitted others to use his or her personal information to obtain fraudulent identification documents. In other instances, it may also indicate unauthorized use of an individual's personal information.

In another embodiment, the methods of either FIG. 6 or FIG. 7 may unintentionally detect duplicate records that, while not being substantially close matches to the probe m image, might actually be very close matches to each other. The method of FIG. 6, can be adapted, for example, to flag such "inter results" matching and initiate a separate search, using those results as new probes. This separate search can take place while the original search is occurring or can wait until the original search is complete, depending on computational and database availability.

We even anticipate that the method of FIG. 6 can be used to implement functionality as disparate as computer dating, searching for models and/or actors, and law enforcement searching. For example, in a computer dating or model/actor search implementation, an individual may be desirous of finding a person in the database who "looks like" their ideal (which ideal may be an image resembling, for example, an ex-girlfriend or boyfriend, a celebrity or model, an idealized image created by the individual, an image that closely resembles the individual himself or herself, etc. An individual can, after retrieving one or two potential match images, then use those images to locate more candidates who resemble the ideal. The results be filtered and refined, manually or automatically, in accordance with age, geographical location, etc.

In a law enforcement application, a law enforcement officer and a victim or witness can search a database of virtually any kind of images (e.g., mug shots, drivers license images, surveillance images, etc.), in an attempt to find an image that most closely resembles a witness/victim's recollection of the alleged criminal's appearance. A police sketch can be used as an initial probe, then, as the witness/victim reviews the results, can select the results that most closely resemble the alleged criminal, and use these images as further probes. Law enforcement can further compare fingerprints retrieved at the scene with any retrieved results, if desired. In that manner, the methods of FIGS. 3, 6, and/7 can be used as an automated electronic lineup.

Figure 10:
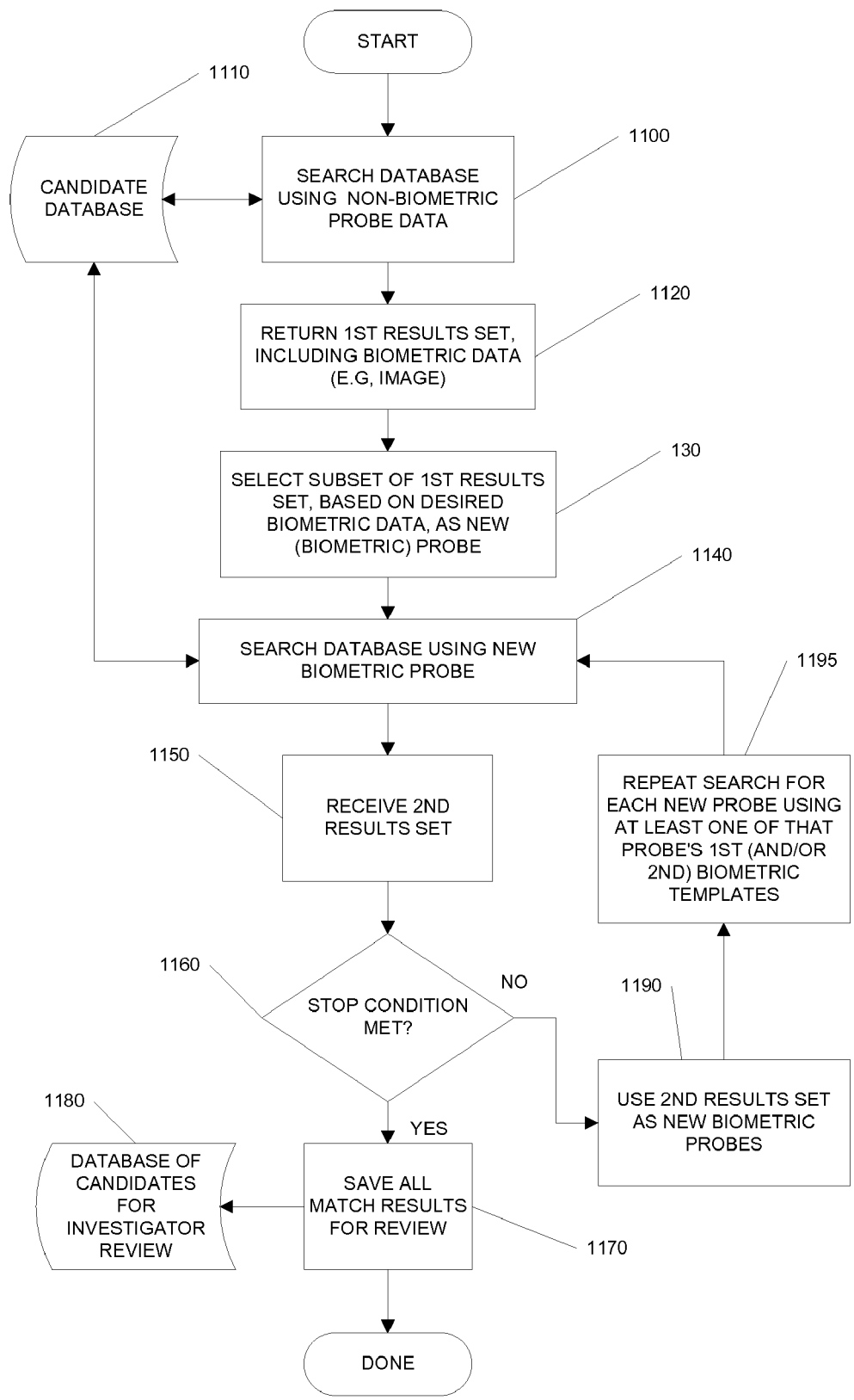
FIG. 10 is a flow chart of a fourth method for conducting a biometric search, in accordance with one embodiment.
Figure 11:
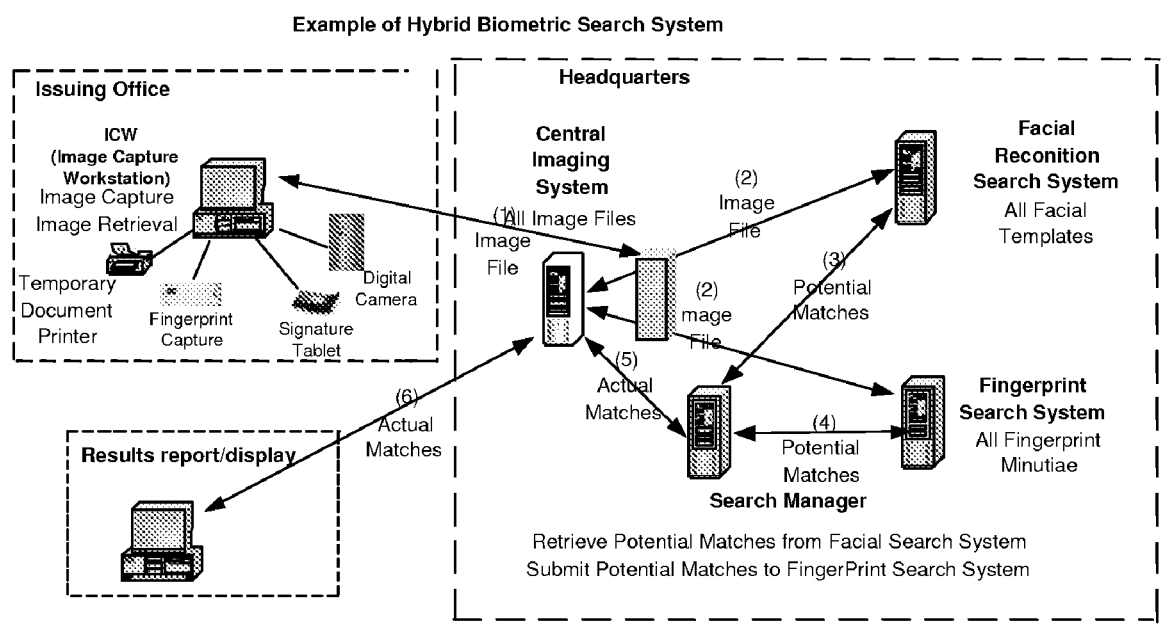
FIG. 11 is a flow chart of a fifth method for conducting a biometric search, in accordance with one embodiment.

The methods we have discovered also can be adapted for a mix of biometric and non-biometric searching. FIG. 10 is a flow chart of a third method for conducting a biometric search, in accordance with one embodiment. In FIG. 10, the database is initially searched using non-biometric probe data (step 1100). For example, a non-biometric probe data set can be used to retrieve all data records having a specific matching demographic and/or administrative feature (e.g., all records showing the same name and birthdate). The results that are retrieved for this search can include biometric data (step 130). A subset of the biometric data can be further reviewed and searched (steps 1140 through 1160), in a manner similar to that described in FIGS. 6 and 7, based on a predetermined criteria. The predetermined criteria can be selected to help further discover fraud and/or errors. For example, if multiple records have the same name and birthdate but show low biometric match scores with each other (based on any biometric), further review may be necessary to determine whether a given "identity" is being used by multiple different individuals. In another example, if multiple records have the same name and birthdate and high biometric match scores, it may be indicative of a record erroneously being entered more than once in a database One advantageous application that we have found for the methods of FIGS. 3, 6 and 7 is in the issuance of identification documents such as driver's licenses. Referring to FIG. 3, if, at step 80, there are any unexpected matches found in the database (e.g., matches that are not legitimate previous records of the individual), the workstation 10 (FIG. 1) can tell the printing system 39 to not print an identification document for the individual until an investigation is conducted Similarly, in FIG. 6 (step 350) and FIG. 7 (step 520), if there are "match results" for review), the workstation 10 (FIG. 1) can tell the printing system 39 to not print an identification document for the individual until an investigation occurs. FIG. 11 is an illustrative a block diagram of a system we have implemented for the issuance if identification documents that implements the methods of FIG. 3.

Of course, those skilled in the art will appreciate that the invention is not limited to the above-described combinations of biometrics technologies. Virtually any cost-effective pairing of one to many and one to few automated biometrics technologies is usable with the invention. In particular, it is envisioned that as some biometrics technologies become less expensive (e.g., one to many fingerprint searching), such technologies may desirable for use in embodiments of the invention. Further, in instances where cost is not an issue but increased speed and/or accuracy of the searching is important, virtually any successive combination of biometrics technologies is usable with embodiments of the invention.

Embodiments of the invention may be particularly usable in reducing fraud in systems used for creating and manufacturing identification cards, such as driver's licenses manufacturing systems. Such systems are described, for example, in U.S. Pat. Nos. 4,995,081, 4,879,747, 5,380,695, 5,579,694, 4,330,350, 4,773,677, 5,923,380, 4,992,353, 480,551, 4,701, 040, 4,572,634, 4,516,845, 4,428,997, 5,075,769, 5,157,424, and 4,653,775, all of which are incorporated herein in their entirety.

Such card systems may include a variety of built in security features, as well, to help reduce identity fraud. In an illustrative embodiment of the invention, the biometric authentication process described above can be used during the production of a photo identification document that includes a digital watermark. Digital watermarking is a process for modifying physical or electronic media to embed a machine-readable code therein. The media may be modified such that the embedded code is imperceptible or nearly imperceptible to the user, yet may be detected through an automated detection process. The code may be embedded, e.g., in a photograph, text, graphic, image, substrate or laminate texture, and/or a background pattern or tint of the photo-identification document. The code can even be conveyed through ultraviolet or infrared inks and dyes.

Digital watermarking systems typically have two primary components: an encoder that embeds the digital watermark in a host media signal, and a decoder that detects and reads the embedded digital watermark from a signal suspected of containing a digital watermark. The encoder embeds a digital watermark by altering a host media signal. To illustrate, if the host media signal includes a photograph, the digital watermark can be embedded in the photograph, and the embedded photograph can be printed on a photo-identification document. The decoding component analyzes a suspect signal to detect whether a digital watermark is present. In applications where the digital watermark encodes information (e.g., a unique identifier), the decoding component extracts this information from the detected digital watermark.

Several particular digital watermarking techniques have been developed. The reader is presumed to be familiar with the literature in this field. Particular techniques for embedding and detecting imperceptible watermarks in media are detailed, e.g., in Digimarc's co-pending U.S. patent application Ser. No. 09/503,881 and U.S. patent application Ser. No. 6,122,403. Techniques for embedding digital watermarks in identification documents are even further detailed, e.g., in Digimarc's co-pending U.S. patent application Ser. Nos. 10/094,593, filed Mar. 6, 2002, and 10/170,223, filed Jun. 10, 2002, co-pending U.S. Provisional Patent Application No. 60/358,321, filed Feb. 19, 2002, and U.S. Pat. No. 5,841,886. Each of the above-mentioned U.S. Patent documents is herein incorporated by reference.

Concluding Remarks

In describing the embodiments of the invention and in illustrating embodiments of the invention in the figures, specific terminology is used for the sake of clarity. However, the invention is not limited to the specific terms so selected, and each specific term at least includes all technical and functional equivalents that operate in a similar manner to accomplish a similar purpose. Use of a given word, phrase, language, terminology, or product brand is intended to include all grammatical, literal, scientific, technical, and functional equivalents. The terminology used herein is for the purpose of description and not limitation.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention.

Having described and illustrated the principles of the technology with reference to specific implementations, it will be recognized that the technology can be implemented in many other, different, forms, and in many different environments. The technology disclosed herein can be used in combination with other technologies. Also, instead of ID documents, the inventive techniques can be employed with product tags, product packaging, labels, business cards, bags, charts, smart cards, maps, labels, etc., etc. The term ID document is broadly defined herein to include these tags, maps, labels, packaging, cards, etc.

It should be appreciated that the methods described above as well as the methods for implementing and embedding digital watermarks, can be carried out on a general-purpose computer. These methods can, of course, be implemented using software, hardware, or a combination of hardware and software. Systems and methods in accordance with the invention can be implemented using any type of general purpose computer system, such as a personal computer (PC), laptop computer, server, workstation, personal digital assistant (PDA), mobile communications device, interconnected group of general purpose computers, and the like, running any one of a variety of operating systems. We note that some image-handling software, such as Adobe's PrintShop, as well as image-adaptive software such as LEADTOOLS (which provide a library of image-processing functions and which is available from LEAD Technologies, Inc., of Charlotte, N.C.) can be used to facilitate these methods, including steps such as providing enhanced contrast, converting from a color image to a monochromatic image, thickening of an edge, dithering, registration, manually adjusting a shadow, etc. Computer executable software embodying the steps, or a subset of the steps, can be stored on a computer readable media, such as a diskette, removable media, DVD, CD, hard drive, electronic memory circuit, etc.).

Moreover, those of ordinary skill in the art will appreciate that the embodiments of the invention described herein can be modified to accommodate and/or comply with changes and improvements in the applicable technology and standards referred to herein. Variations, modifications, and other implementations of what is described herein can occur to those of ordinary skill in the art without departing from the spirit and the scope of the invention as claimed.

The particular combinations of elements and features in the above-detailed embodiments are exemplary only; the interchanging and substitution of these teachings with other teachings in this and the incorporated-by-reference patents/applications are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto.

All publications and references cited herein are expressly incorporated herein by reference in their entirety. Having described the preferred embodiments of the invention, it will now become apparent to one of ordinary skill in the art that other embodiments incorporating their concepts may be used. These embodiments should not be limited to disclosed embodiments, but rather should be limited only by the spirit and scope of the appended claims.

What is claimed is:

1. A computer-implemented method for determining whether an individual should receive an identification document comprising:
  (a) providing a computer system and a database, the database being operatively connected to the computer system;
  (b) the database containing a database of biometric templates of individuals;
  (c) providing at least one device for inputting at least a first and second biometric template of at least one individual into the computer system;
  (d) receiving an initial probe data set, the first probe data set comprising first and second biometric templates associated with at least one individual;
  (e) inputting at least a first and second biometric template into the computer system using the device;
  (f) searching the database of biometric templates using the first biometric template to retrieve a first results set, the first results set comprising a data set for any individual who has a biometric template that satisfies a predetermined first criteria, the data set comprising biometric template information that is searchable using the second biometric template;
  (g) selecting a first portion of the first results set that satisfies a match criteria;
  (h) searching the first portion of the results set using the second biometric template to retrieve a second results set, the second results set comprising a data set for any individuals who have a biometric template that satisfies a predetermined second criteria, the data set comprising biometric template information that is searchable using the first and second biometric templates;
  (i) selecting a first portion of the second results set to be a refined probe data set;
  (j) searching the database of biometric templates using the refined probe data set to return a results set, the results set comprising biometric templates that satisfy a predetermined third criteria; and (k) analyzing the results set that satisfy the predetermined third criteria to determine whether the individual is attempting to fraudulently obtain an identification document.

2. The method of claim 1, further comprising denying the individual an identification document if, after analysis, the determination is that the individual is attempting to fraudulently obtain an identification document.

3. The method of claim 1 further comprising capturing first and second images of the individual, the first image capable of being converted into the first biometric template of a first type, the second image capable of being converted into the second biometric template of a second type.

4. The method of claim 1 wherein the first type of biometric is different than the second type of biometric.

5. A computer readable medium on which is stored instructions, which when executed by a computer, perform the method of claim 1.

6. The method of claim 1, wherein at least one of the first and second biometric templates is a facial image.

7. The method of claim 1, wherein both of the first and second biometric templates are facial images.

8. The method of claim 1, wherein one of the first and second biometric templates is a facial image and the second of the first and second templates is a fingerprint.

* * * * *